March 24, 1936.  R. E. GINN  2,034,807
PORTABLE GAUGE FOR AUTOMOBILES
Filed Aug. 18, 1934
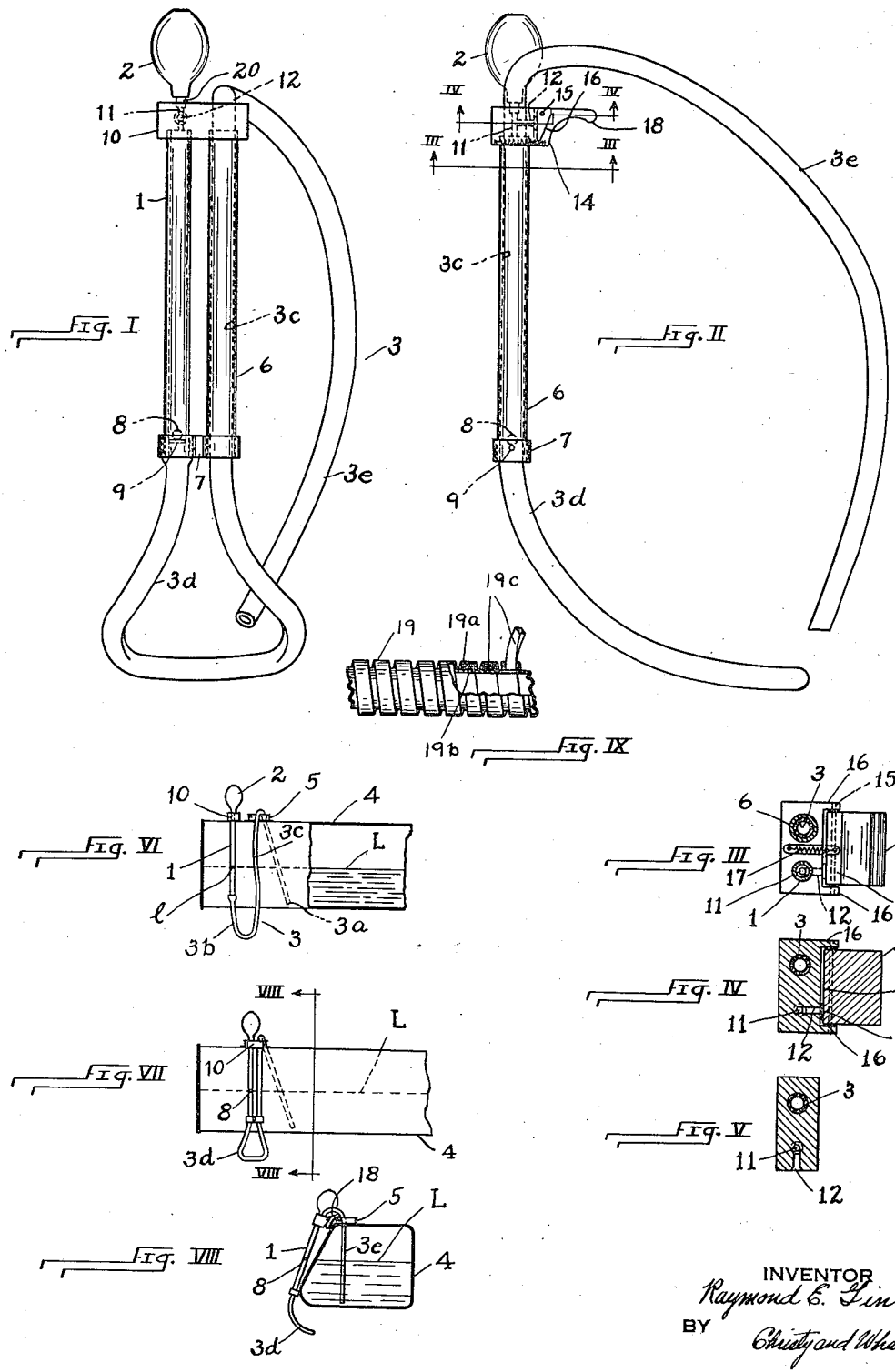
INVENTOR
Raymond E. Ginn
BY Christy and Wharton
ATTORNEYS.

Patented Mar. 24, 1936

2,034,807

UNITED STATES PATENT OFFICE 2,034,807

PORTABLE GAUGE FOR AUTOMOBILES

Raymond E. Ginn, Pittsburgh, Pa.

Application August 18, 1934, Serial No. 740,447

6 Claims. (Cl. 73—54)

My invention relates to a gauge, and more particularly to a gauge for the fuel tanks of motor cars. My gauge is a portable gauge, which is primarily intended for the use of service station attendants, as distinguished from a gauge that is permanently installed in a car and intended primarily for the benefit of the car operator.

When a car is driven into a service station to receive a full charge of fuel, the attendant is confronted with a problem. While he is charging gasoline into the fuel tank, he has no visible means of ascertaining when the fuel level is approaching the top of the tank. The dashboard gauge, with which the usual car is equipped, is of little or no value to the attendant—from his position at the rear of the car he cannot observe it; furthermore, a fuel gauge that is mounted upon a dash-board is not minutely accurate— in the case of the usual liquid gauge the operation lags behind the rising level of fuel in the tank, while in the case of the well-known electric gauge there is no operation when the ignition key is turned off, as it should be while fuel is being charged. Accordingly, the attendant in filling a tank must guess when the level is approaching the inlet opening of the tank, with the result that even the most careful attendants frequently are unable to stop the flow of gasoline before the tank is over-charged. The consequent loss of gasoline is wasteful, and annoying to both the customer and the service station attendant.

The object of my invention is to provide a remedy for this uncertain and wasteful practice, and, in accordance with my aim, I have provided a light, portable instrument which may be used on any car whose tank is to be filled with fuel. In accordance with my objects the fuel-gauging instrument is economical to construct, accurate in service, and adapted to be readily and in an instant installed on a fuel tank.

In the accompanying drawing an instrument embodying the invention is illustrated; Fig. I is a view of the instrument in front elevation, and Fig. II is a view thereof in side elevation; Figs. III and IV are views in cross section, taken respectively on the planes III—III and IV—IV of Fig. II; Fig. V is a view comparable with Fig. IV, and illustrating a modification in structure; Fig. VI is a fragmentary view, showing the fuel tank of an automobile, partly in rear elevation and partly in vertical section, and illustrating how my instrument in simplified form is used in service; Fig. VII is a fragmentary view of a fuel tank in rear elevation, showing in position of service thereon the gauge which is illustrated in Figs. I and II; Fig. VIII is a sectional view, taken on the plane VIII—VIII of Fig. VII, and Fig. IX is a fragmentary view to larger scale, showing partly in elevation and partly in section a modified form of tubing which may be used in the instrument.

Referring to the drawing, the reference numeral 1 is applied to a transparent tube, say a tube of glass. The upper end of the tube communicates with a suction device which advantageously takes the form of a hollow rubber bulb 2. The bulb 2, otherwise closed, includes an orifice at its lower end and communicates with the interior of tube 1.

The upper end of the tube 1 is secured in a header 10, and the bulb 2 is secured in the header, by means of a tubular union 20 (Fig. I). The header is formed of metal; I have used aluminum, but contemplate other material. A passage 11 is formed in the header, and establishes communication between the bulb 2 and the interior of tube 1, and an air vent 12 extends laterally from this passage and is adapted alternately to be closed and opened to the atmosphere.

A flexible tube 3 is secured to the lower end of the tube 1, and such flexible tube is formed of rubber which is chemically resistant to gasoline and other petroleum distillates—and so is the bulb 2. A rubber of this sort is known to the art, and, while I cannot give its formula, I believe that it is a synthetic rubber, and know that such a rubber may be obtained on the open market under the name "Duprene."

It will be seen that the elements 1 and 3 form a tube which is rigid and transparent in part and flexible and non-transparent in part, and which throughout is resistant to gasoline or the like.

Fig. VI shows a fuel tank 4 of an automobile, and as usual the tank is provided with an inlet 5. When the service station attendant uncovers the inlet 5 to fill the tank with gasoline, he first inserts the tube 3, bringing its free end 3a to a position against or adjacent the bottom of the tank, and positioning the tube 1 against the side of the tank, with the upper end of the tube 1 lying substantially flush with the top of the tank; then, upon making sure that the air vent 12 is closed (this detail will be later described), he compresses and releases the bulb 2, whereby air is withdrawn from the tube 1 and in natural consequence liquid fuel is drawn from the tank, upward into the tube 3. It is important to note that the tubing 3 is in length more than twice the depth of the tank, whereby, when the attendant has arranged the apparatus in the position shown in Fig. VI, a U-bend 3b is formed in the tubing, with the bend lying below the level of the liquid in the tank. The bulb 2 is of such capacity, that, in one manipulation of it, it is effective to fill the portion of tubing extending into the tank with gasoline, and additionally to draw fuel into the tubing portion 3c lying on the outside of the tank. Accordingly, when the attendant opens the air vent 12, syphonic action is instrumental in forcing gasoline into the tubing 1, 3 until the level l of the liquid in the glass tube 1 is even with the level L of liquid in the tank. Thereupon, the attendant begins charging gasoline (in usual manner) into the tank, and in accordance with well-known hydraulic laws the visible level of liquid in tube 1 rises with the level of gasoline in the tank. Thus, the attendant is able to keep accurate check on the rising level of gasoline in the tank, and he can quickly and completely fill the tank with no danger of overflow. When the tank is filled, the attendant raises the instrument above the inlet 5 (the air vent 12 being open), so that the liquid in tubing 1, 3 is drained. Then, the free end of tubing 3 is withdrawn from the tank and the inlet 5 is covered as usual.

As illustrated in Figs. I and II, when the tubing 3 comprises unreinforced rubber tubing, I advantageously provide a metal tube 6 for supporting its intermediate portion 3c. The tube 6 is secured at its upper end in the header 10, and extends downward in close parallelism with the sight-glass or gauge tube 1. The lower ends of sight-glass 1 and tubing portion 3c are interconnected by a loop tubing portion 3d, which portion 3d corresponds to the U-portion 3b referred to in Fig. VI. A bracket 7 holds secure the union of tubing loop 3d with the sight-glass 1, and serves to support the lower ends of tubes 1 and 6 in their illustrated relative positions. An intake tubing portion 3e is connected to the upper end of tubing portion 3c, and provides the intake syphon element which in service is inserted in the fuel tank. While the several elements 3c, 3d, and 3e of the syphon tubing may be independent parts, interconnected as described, they advantageously comprise a single length of tubing. Indeed, as shown in Figs. I and II, a single length 3 of such tubing is secured at one end to the bottom of sight-glass 1, formed in a loop (3d), and passed upward through the supporting tube 6 and header 10, whence it extends downward, to provide the intake element 3e. It will be observed that in this structure all elements of the syphon tube, including the sight-glass, are secured in proper relative positions, so that it is simply necessary to insert the intake element 3e in the tank, and to bring the companion members 1, 6 to position against the side of the tank, as shown in Fig. VII. As indicated in Fig. V, the air vent 12 may extend from the passage 11 to the outer face of the header 10, so that, upon inserting the intake 3e into the tank, the attendant may hold his thumb or finger over the mouth of the vent, while the bulb 2 is operating to draw liquid upward into tubing portions 3e and 3c. The vent is then uncovered, and syphonic action causes fuel to rise in the sight-glass 1 to common level with the fuel in the tank. Thereupon, the tank may be filled under the observation of the attendant, as already described.

I have found that a float-ball 8 may, with good results, be included in the sight-glass 1. A cross stay 9, or other abutment, (Fig. I) is secured in the bottom of the sight-glass, and serves as a positive stop at the lower limit of travel of the float, while a stop at the upper limit of travel is provided by the mouth of passage 11. The floatball 8 rides the surface of liquid introduced to the sight-glass, and affords a more apparent indication of level than is afforded by the surface of colorless gasoline alone. I intend that the float-ball shall be brightly colored, and in some cases I shall coat the ball with radium paint, or other inherently luminous material, whereby clear and exact observation of the gauge may be made in the dark.

Still another valuable feature is embodied in the apparatus. As shown in Figs. II to IV, the air vent may be closed by a valve 13; the valve 13 conveniently comprises a disk of the abovementioned resistant rubber secured to the inner face of a block 14; the block 14 is pivotally mounted adjacent its top upon a pin 15, extending between a pair of lugs 16, 16 integrated with the header 10; a tension spring 17 (Fig. III) is secured at its one end to the header 10 and at its opposite end to the bottom of the block 14, and this spring tends to swing the block 14 inward of the header 10, in such manner that the valve 13 is held in position of closure over the air vent 12 (Fig. IV). The block 14 carries an operating arm 18; the arm projects a substantial interval from the assembly, and its nether face is curved downward, to provide in effect a hook upon which the gauge may be hung. The strength of the spring 17 is insufficient to restrain the swinging of the block 14 when the weight of the instrument acts upon the arm 18, and, accordingly, the air vent 12 remains uncovered so long as the instrument is supported by the arm.

In using the instrument which embodies the automatic valve described immediately above, the intake hose or tubing 3e is inserted in the tank, and the bulb 2 is compressed and released. While this is done, the instrument is held in the hand, and the air vent 12 is closed by the valve 13. When the bulb 2 has restored itself to normal position, and in consequence the tubing portions 3e, 3c have been charged with liquid from the tank, the operating arm 18 is hooked over the edge of the filling inlet 5 of the tank and the instrument is allowed to hang thereon, as shown in Figs. VII and VIII. The weight of the instrument acting upon the arm 18 is effective, as already stated, to swing the block 14 outward, so that the air vent is uncovered; thereupon the liquid level in the sight-glass rises to the level L. The proportions of the parts are such that when the gauge hangs upon the arm 18, the sight-glass is accurately positioned verticaly of the tank 4. The charging of the tank is then accomplished with visible check on the liquid level within the tank. In removing the instrument, the intake tubing portion 3e is allowed to remain in the tank, and the gauge is elevated to a position above the inlet 5; the valve (13, 14, 18) is manually held in open position, and the instrument is quickly drained.

It has been found that there is a tendency for liquid to collect or "hang" in the tube portion 3d after draining, and, manifestly, this residual liquid must be removed before the gauge may be used again, otherwise an air pocket will be formed between the tubing portions 3d and 3e, and the accuracy of the instrument destroyed. My apparatus is effective to remove all such residual liquid in the following manner: Before the inlet tubing portion 3e is inserted in a tank, and while the vent 12 is closed, I quickly compress the bulb 2, and send a gust of air through the tubing (1, 3d, 3c, 3e), sweeping out any liquid collected therein. Then, I may proceed with the normal use of the instrument, with the assurance of greatest accuracy.

Whereas the tubing 3 has been described as a rubber tubing, I have in mind that it may advantageously comprise a tubing of other sort. I have found that flexible metallic hose 19 (Fig. IX) may serve. As is well-known, metallic hose is formed by coiling a strip of sheet metal helically; the strip of metal is so fashioned in cross section that the successive coils interlock, and in accordance with usual practice a continuous string of asbestos or other packing material is coiled with the metallic strip and enclosed between the interlocking elements 19a, 19b of the coils, so that the hose is flexible and presents inner and outer surfaces of metal. Contrary to general practice, in my case the tubing 19 must be extremely flexible, air-tight, and resistant to petroleum distillates, and accordingly I have developed a specialized metallic tubing. The strip metal of the tubing may be formed of brass, copper, aluminum, zinc composition, or a composition of other metals or alloys which is neutral to petroleum or its products. The strip is shaped and coiled in the customary way, and during the coiling a "cord" 19c of neutral (Duprene) rubber is tightly enclosed between the interlocking elements of the coils. The tubing thus formed is extremely flexible, air-tight, and resistant to the chemical action of gasoline.

In using such metallic hose in the gauge, I find that the supporting tube 6 may be eliminated, with consequent simplification and economy in manufacture.

It will be seen that I have provided a portable instrument which may be quickly installed for service on an automobile fuel tank. It is noteworthy that all portions of the apparatus are readily secured in proper relative positions, and, furthermore, no appreciable time or trouble is required to remove the instrument from service. Accordingly, a specific problem has been solved, and the advantages desired have been obtained in largest measure.

I claim as my invention:

1. A portable gauge for the fuel tanks of automobiles, comprising a syphon tube which is transparent and rigid in part, flexible in part, and resistant to petroleum distillates or the like throughout, a suction device at one end of said tube, and an air vent communicating with the end of said tube that communicates with said suction device and adapted to be alternately opened and closed.

2. A portable gauge for the fuel tanks of automobiles, including a sight-glass tube, a companion tube portion supported in definite position relatively thereto, a tube portion interconnecting the lower ends of said sight-glass and said companion tube portion, a suction device organized with the upper end of said sight-glass, an air vent communicating with said upper end of the sight-glass, said air vent being adapted to be alternately opened and closed, and a syphon tube portion extending from the top of said companion tube portion downward.

3. A portable gauge for the fuel tanks of automobiles, comprising a sight-glass, a suction device connected to the upper end of said sight-glass, an air vent communicating with the upper end of said sight-glass, a tube portion supported adjacent said sight-glass, a tube portion connecting the lower ends of said first-mentioned tube portion and said sight-glass, and an intake tube portion extending from the top of said first-mentioned tube portion downward.

4. A portable gauge for the fuel tanks of automobiles, comprising a header, a sight-glass secured at one end to said header, a syphon tube connected to the lower end of said sight-glass, a suction device communicating through said header with said sight-glass, an air vent in said header communicating with the upper end of said sight-glass, and a valve normally closing said vent, said valve including a movable operating arm by means of which the gauge may be suspended, and, when the gauge is so suspended, said operating arm being effective in holding said valve in open position.

5. A portable gauge for the fuel tanks of automobiles, including a syphon tube which is transparent and rigid in part, flexible in part, and resistant to petroleum distillates and the like throughout, the flexible portion of said tube comprising a flexible metallic tube packed with neutral sealing material, a suction device at one end of said tube, and an air vent communicating with said tube adjacent the end thereof connected to said suction device, said air vent being adapted to be alternately opened and closed.

6. A portable gauge for the fuel tanks of automobiles, comprising a header, a sight-glass and a tube portion supported by and extending in companion reaches downward from said header, a tube portion interconnecting the lower ends of said first-mentioned tube portion and said sight-glass, and an intake tube portion communicating with the upper end of said first-mentioned tube portion and extending downward from said header, a suction device communicating with the upper end of said sight-glass, an air vent in said header communicating with said sight-glass, a valve for said vent, a movable operating arm for said valve, said operating arm providing means for the support of said gauge, and, when so serving, being effective to hold said valve in open position.

RAYMOND E. GINN.